(12) United States Patent
Han

(10) Patent No.: US 8,605,800 B2
(45) Date of Patent: Dec. 10, 2013

(54) APPARATUS AND METHOD FOR PERFORMANCE ENHANCEMENT IN OPEN LOOP MULTI CELL MIMO SYSTEM

(75) Inventor: Shuangfeng Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/196,295

(22) Filed: Aug. 2, 2011

(65) Prior Publication Data
US 2012/0034911 A1 Feb. 9, 2012

(30) Foreign Application Priority Data
Aug. 4, 2010 (KR) .................. 10-2010-0075308

(51) Int. Cl.
*H04L 27/00* (2006.01)

(52) U.S. Cl.
USPC ......... 375/259; 375/285; 375/296; 455/550.1

(58) Field of Classification Search
USPC .............. 375/219, 222, 224, 259–260, 285, 375/295–296, 227; 455/403, 522, 507, 455/63.1, 67.13, 550.1, 88, 91, 95, 114.2, 455/115.1; 370/252
See application file for complete search history.

(56) References Cited

U.S. PATENT DOCUMENTS

| 2009/0003474 | A1* | 1/2009 | Pan et al. ........................ 375/260 |
| 2012/0275529 | A1* | 11/2012 | Khojastepour ............... 375/260 |
| 2012/0275542 | A1* | 11/2012 | Khojastepour ............... 375/295 |
| 2013/0039437 | A1* | 2/2013 | Khojastepour ............... 375/267 |

* cited by examiner

Primary Examiner — Jean B Corrielus
(74) Attorney, Agent, or Firm — Jefferson IP Law, LLP

(57) ABSTRACT

An apparatus and a method for operating a Mobile Station (MS) in a wireless communication system are provided. The method includes receiving a threshold for a gap of an average Receive (Rx) power between a neighboring Base Station (BS) and a serving BS, transmitting to the serving BS, identification information of a BS having the average power greater than a first value, receiving information of a BS involving joint processing generated using information of the BS having the average power greater than the first value, feeding Precoding Matrix Index (PMI) information of the BS involving the joint processing, back to the serving BS, receiving information indicating a PMI operation mode of the MS, from the serving BS, and determining a PMI operation mode according to the information indicating the PMI operation mode of the MS.

36 Claims, 9 Drawing Sheets

| PMI 1 | PMI c11 | PMI c12 | PMI c13 2 | PMI c21 | PMI c22 | PMI c23 | PMI c24 3 | PMI c31 | PMI c32 4 | PMI c41 | PMI c42 | PMI c43 5 | PMI c51 | PMI c52 | PMI c53 | PMI c53 6 | PMI c61 | PMI c62 | PMI c63 |

| PMI 1 | PMI 2 | PMI 3 | PMI 4 | PMI 5 | PMI 6 | PMI c11 | PMI c21 | PMI c31 | PMI c41 | PMI c51 | PMI c61 | PMI c12 | PMI c22 | PMI c32 | PMI c42 | PMI c52 | PMI c62 | PMI c12 | PMI c23 | PMI c33 | PMI c43 | PMI c53 | PMI c63 |

FIG.6

Row 1: PMI 1, PMI 1, PMI 2, PMI 2, PMI 2, PMI 2, PMI 3, PMI 3, PMI 3, PMI 3, PMI 4, PMI 4, PMI 4, PMI 4, PMI 5, PMI 5, PMI 5, PMI 5, PMI 6, PMI 6, PMI 6

Row 2: PMI 1, PMI 2, PMI 3, PMI 4, PMI 5, PMI 6, PMI 1, PMI 2, PMI 3, PMI 4, PMI 5, PMI 6, PMI 1, PMI 2, PMI 3, PMI 4, PMI 5, PMI 6

FIG.7

APPARATUS AND METHOD FOR PERFORMANCE ENHANCEMENT IN OPEN LOOP MULTI CELL MIMO SYSTEM

PRIORITY

This application claims the benefit under 35 U.S.C. §119(a) of a Korean patent application filed in the Korean Intellectual Property Office on Aug. 4, 2010, and assigned Serial No. 10-2010-0075308, the entire disclosure of which is hereby incorporated by reference.

BACKGROUND OF THE INVENTION

1. Field of the Invention

The present invention relates to a wireless communication system. More particularly, the present invention relates to an apparatus and a method for enhancing performance using Precoding Matrix Index (PMI) cycling or PMI repetition in an open loop multi-cell Multiple Input Multiple Output (MIMO) system.

2. Description of the Related Art

Research has led to the development of next generation mobile communication systems such as a $4^{th}$ Generation (4G) communication system or International Mobile Telecommunication (IMT)-Advanced.

The next generation communication systems are based on an Institute of Electrical and Electronics Engineers (IEEE) 802.16m standard or a 3rd Generation Partnership Project (3GPP) Long Term Evolution (LTE) Advanced standard. These standards adopt an Orthogonal Frequency Division Multiplexing (OFDM)/Orthogonal Frequency Division Multiple Access (OFDMA) scheme in order to support a broadband network in a physical channel.

However, in such a system, a mobile station traveling in or around the edge of a base station can suffer from interference. This interference is referred to as inter-cell interference.

A multi-cell Multiple Input Multiple Output (MIMO) system is an efficient method for mitigating the inter-cell interference. Using this method, a cell edge and cell average throughputs can be enhanced and base station coverage area can be expanded.

However, a closed loop multi-cell MIMO system is subject to PMI aging because of feedback delay and backhaul delay of the mobile station.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for enhancing performance in an open loop multi-cell Multiple Input Multiple Output (MIMO) system.

Another aspect of the present invention is to provide an apparatus and a method for enhancing performance using Precoding Matrix Index (PMI) cycling or PMI repetition in an open loop multi-cell MIMO system.

In accordance with an aspect of the present invention, an operating method of a Mobile Station (MS) in a wireless communication system is provided. The method includes receiving a threshold for a gap of an average Receive (Rx) power between a neighboring Base Station (BS) and a serving BS, transmitting to the serving BS, identification information of a BS having an average power greater than a first value, receiving information of a BS involving joint processing generated using information of the BS having the average power greater than the first value, feeding PMI information of the BS involving the joint processing, back to the serving BS, receiving information indicating a PMI operation mode of the MS, from the serving BS, and determining a PMI operation mode according to the information indicating the PMI operation mode of the MS.

In accordance with another aspect of the present invention, an operating method of a BS in a wireless communication system is provided. The method includes receiving from an MS, identification information of a BS having an average power greater than a first value, performing coordination for joint processing with a neighboring BS for the MS using the identification information, transmitting information of a BS involving the joint processing, to the MS, receiving PMI information fed back from the MS within a coverage area, coordinating subbands by jointly determining a precoder with collaborative BSs, and broadcasting information indicating a PMI operation mode of the MS.

In accordance to yet another aspect of the present invention, an apparatus of an MS in a wireless communication system is provided. The apparatus includes a modem for converting information into a signal, transmitting the signal, and converting a received signal into information, and a controller for receiving a threshold for a gap of an average Receive (Rx) power between a neighboring BS and a serving BS, for transmitting to the serving BS, identification information of a BS having the average power greater than a first value, for receiving information of a BS involving joint processing generated using information of the BS having the average power greater than the first value, for feeding Precoding Matrix Index (PMI) information of the BS involving the joint processing back to the serving BS, for receiving information indicating a PMI operation mode of the MS from the serving BS, and for determining a PMI operation mode according to the information indicating the PMI operation mode of the MS.

In accordance with still another aspect of the present invention, an apparatus of a BS in a wireless communication system is provided. The apparatus includes a modem for converting information into a signal, for transmitting the signal, and for converting a received signal into information, and a controller for receiving from an MS, identification information of a BS having an average power greater than a first value, for performing coordination for joint processing with a neighboring BS for the MS using the identification information, for transmitting information of a BS involving the joint processing to the MS, for receiving PMI information fed back from the MS within a coverage area, for coordinating subbands by jointly determining a precoder with collaborative BSs, and for broadcasting information indicating a PMI operation mode of the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a diagram of Precoding Matrix Index (PMI) cycling according to an exemplary embodiment of the present invention; and FIG. 7 is a diagram of PMI repetition according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for enhancing performance in an open loop multi-cell Multiple Input Multiple Output (MIMO) system.

Hereinafter, exemplary embodiments of the present invention relate to inter-cell interference mitigation in a MIMO wireless communication system and an Orthogonal Frequency Division Multiplexing (OFDM)/Orthogonal Frequency Division Multiple Access (OFDMA)-based wireless communication system, for example. However, the present invention is also applicable to other wireless communication systems.

For ease of understanding, terms used in various standards are referred to herein. For example, the terms used in, but not limited to, an Institute of Electrical and Electronics Engineers (IEEE) 802.16m standard and 3rd Generation Partnership Project (3GPP) Long Term Evolution (LTE) Advanced standard. Hereinafter, a system based on the IEEE 802.16m standard is referred to as a IEEE 802.16m system, and a system based on the 3GPP LTE Advanced standard is referred to as a LTE system.

Figure 1:
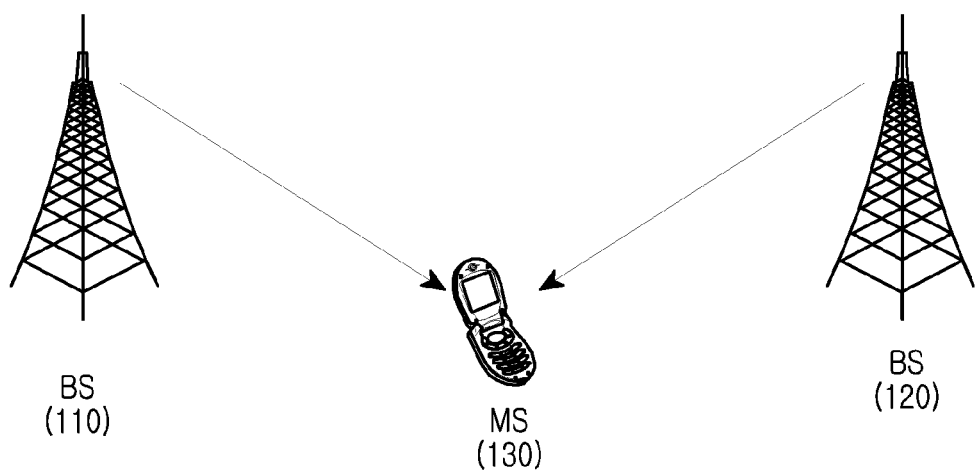
FIG. 1 is a diagram of inter-cell interference generated in a wireless communication system according to an exemplary embodiment of the present invention.

FIG. 1 is a diagram of inter-cell interference generated in a wireless communication system according to an exemplary embodiment of the present invention.

Referring to FIG. 1, a Mobile Station (MS) 130 receives downlink data by decoding a received signal using a radio resource allocated by a Base Station (BS) 110. In this case, the radio resource allocated by the BS 110 to the MS 130 is the same as a radio resource used by an interfering BS 120, the MS 130 receives both of the downlink signal from the BS 110 and the downlink signal from the BS 120.

Since the MS 130 decodes a mixed signal of the two downlink signals, it may not easily receive data. This implies that the downlink signal from the BS 120 functions as interference to the MS 130.

As described above, in the OFDM/OFDMA-based wireless communication system such as the IEEE 802.16m system or the LTE Advanced system, inter-cell interference of a DownLink (DL) signal or a UpLink (UL) signal transmitted from another cell using the same frequency resource or time resource can degrade the system performance.

Besides the OFDM/OFDMA scheme, the IEEE 802.16m system or the LTE Advanced system both employ a MIMO scheme. Compared to a single-antenna wireless communication system, a transmitter and a receiver in a multi-antenna wireless communication system increase channel transmission capacity in proportion to the number of antennas without additional frequency or Transmit (Tx) power allocation. An advantage of the MIMO scheme is alleviation of the inter-cell interference.

To reduce the inter-cell interference, the MIMO wireless communication system such as the IEEE 802.16m system or the LTE Advanced system, uses a precoding matrix.

In the downlink communication, the BS multiplies a Tx signal by the precoding matrix in order to remove the interference to a neighboring cell and to maximize downlink performance in the cell.

The precoding matrix used in the interference mitigation is one of precoding matrixes in a codebook. Herein, each precoding matrix can be distinguished by a Precoding Matrix Index (PMI). A particular codebook used by the BS relies on the standard of a BS operation.

A PMI coordination scheme is adopted to mitigate the inter-cell interference using the precoding matrix. In so doing, the MS in the cell boundary measures a downlink channel of its serving BS and specifies channels of every interfering BS.

When determining the PMI, the MS can determine one PMI or all PMIs among preferred PMIs or unwanted PMIs. Upon determining the PMI for the serving BS and the interfering BS, the MS feeds the PMI for the serving BS and the interfering BS back to the serving BS.

The serving BS uses the PMI and forwards the PMI for the interfering BS to the interfering BS over a backhaul. Using the PMI received from the serving BS, the interfering BS regulates the downlink transmission. Hence, the interference on the MS caused by the interfering BS is reduced.

However, a downlink channel condition varies with time or according to a place. In other words, when delay occurs between the downlink channel measurement of the MS and the Tx control of the interfering BS, the aforementioned PMI scheme causes PMI aging.

This delay results from feedback delay and backhaul delay. The feedback delay corresponds to the time taken for the MS to transmit the PMI referred to when one of the PMIs of the codebook is selected, to the serving BS. The backhaul delay corresponds to the time taken for the serving BS receiving the PMI from the MS to communicate the PMI received from the MS with the interfering BS over the backhaul connection.

To reduce the delays, when the backhaul related technology does not show significant enhancement, it is practically hard to implement a closed loop multi-cell MIMO technology. To alleviate the adverse effect of the feedback delay and the backhaul delay in the system performance, the open loop multi-cell MIMO technique has been considered for an actual deployment.

Precoder cycling is important in a single-cell open loop MIMO system. Herein, in a frequency domain, each BS uses a transmitter precoder of the fixed order in a given codebook.

In each frequency subband, the MS can know which precoder is used by the BS, and measure an effective Signal to Noise Ratio (SNR).

Every MS in the open loop MIMO system will feed the Signal to Noise and Interference Ratio (SINR) back to the BS. The BS determines which MS to schedule in each subband.

In a single-cell scenario, since every MS travels around the single BS, a preset precoder can be matched to one MS channel. However, it is difficult to apply the single-cell open loop MIMO scheme to a multi-cell environment.

This is because the MSs in the multi-cell open loop MIMO system mostly travel in the boundary of the neighboring BS and can suffer performance loss because of a precoding cycling.

Thus, an exemplary embodiment of the present invention provides the precoding cycling based on the open loop multi-cell MIMO scheme.

The current IEEE 802.16m standard defines two MIMO types.

The first type is described below.

The first type includes PMI coordination as the single-BS precoding technique in multi-BS coordination, and uses codebook-based feedback or uplink sounding. It is supported by the codebook-based feedback and interference nulling. When the closed loop MIMO precoding is applied to the serving cell and the neighboring cell, the single BS precoding including the multi-BS coordination can activate the BS with respect to one or more MSs. The inter-cell interference can be mitigated by coordinating the precoding applied to the neighboring cell through high layer signaling based on the feedback from the MS to the corresponding serving BS. In the codebook-based feedback, the PMI coordination can be applied by the BS as one of PMI recommendation or PMI restriction.

The second type is described below.

As a joint MIMO transmission technique crossing the multi-BS, the BS and the MS can support adaptive precoding based on multi-BS joint processing. Examples of the multi-BS joint processing can include Closed-Loop Macro Diversity (CL-MD) transmission or Collaborative MIMO (Co-MIMO) transmission.

The multi-BS joint MIMO processing applies adaptive or non-adaptive precoding to the serving cell and the neighboring cell. When user data is shared in a multi-cell, the BS can activate for one or more MSs.

In the adaptive precoding, a precoder matrix $W_k$ is derived from the feedback of the MS. The feedback can include, for example, the codebook-based feedback and the sounding-based feedback. The CL-MD and the Co-MIMO, which are the two adaptive precodings based on the multi-BS joint processing, are supported. When the CL-MD is activated, the single MS is served by a plurality of coordinating BSs. When the Co-MIMO is activated, multiple MSs are served by a plurality of coordinating BSs through Multi-User (MU)-MIMO scheduling and precoding.

The BS and the MS according to an exemplary embodiment of the present invention operate as follows.

The MS measures the downlink channel of the neighboring BSs based on a downlink reference signal. The MS can measure a reference signal of the serving BS. Herein, the reference signal can be a midamble signal or a pilot signal.

The BS broadcasts a threshold for a gap of an average Receive (Rx) power between the neighboring BS and the serving BS. Hereinafter, the threshold is referred to as P_delta.

The MS informs the serving BS of a BS IDentification (BSID) or a temporary BSID of the BS having an average power greater than P−P_delta. Herein, P is the Rx power of the serving BS reference signal.

The serving BS and the corresponding neighboring BS perform the joint processing coordination for the MS.

The BS informs the MS of information of the BSs involving the joint processing, using a bitmap or the BSID based on the neighboring BSID feedback of the MS.

The MS feeds a Tx covariance matrix of the involved BS or a principal eigenvector for the serving BS of an involved BS, back to the serving BS. The principal eigenvector can be expressed as the PMI. This is to find a vector U in the codebook, for the eigenvector V (in 1 by m dimension). U is indicated by the PMI and is the vector for maximizing norm (V*U'). Herein, the Tx covariance matrix can indicate long term PMI coordination execution.

The BS collects every covariance matrix, principal eigenvector, or PMI fed back from the MS within the coverage area of the BS.

A collaborative BS coordinates the subbands by jointly determining an Open Loop (OL) MIMO precoder. The number of MSs served by the collaborative BS is referred to as ms_num. The PMI reported by an i-th MS for a j-th collaborative BS is Vi,j. The BS broadcasts one bitmap indicating the reported PMI corresponding to the principal eigenvector. For example, a PMI list of the j-th BS includes V1,j, V2,j, . . . , Vms_num,j.

The BS also determines and broadcasts a parameter PMI_cycle_mod e(1 bit). Based on a subband number Nsub and the reported PMI number ms_num, the BS and the MS can determine a parameter Ncycle the number of cycles of the reported PMI based on the following equation.

$$N\text{cycle}=[N\text{sub}/ms\_\text{num}] \qquad (1)$$

Nsub denotes the number of subbands and ms_num denotes the number of the reported PMIs. Herein, Ncycle is not broadcast.

When the PMI_cycle_mode=0b0, uses a repetition mode. For example, with 24 subbands, three reported PMIs will be repeated for eight times. The repetition mode is illustrated in FIG. 7.

When Nsub>ms_num*Ncycle, the last PMI will be repeated more than Ncycle.

When PMI_cycle_mode=0b1, the PMI cycle mode is a cycling mode based on a correlation level. The Ncycle PMI of the highest correlation in the reported PMIs will be cycled. The cycling mode is illustrated in FIG. 6.

Figure 2A:
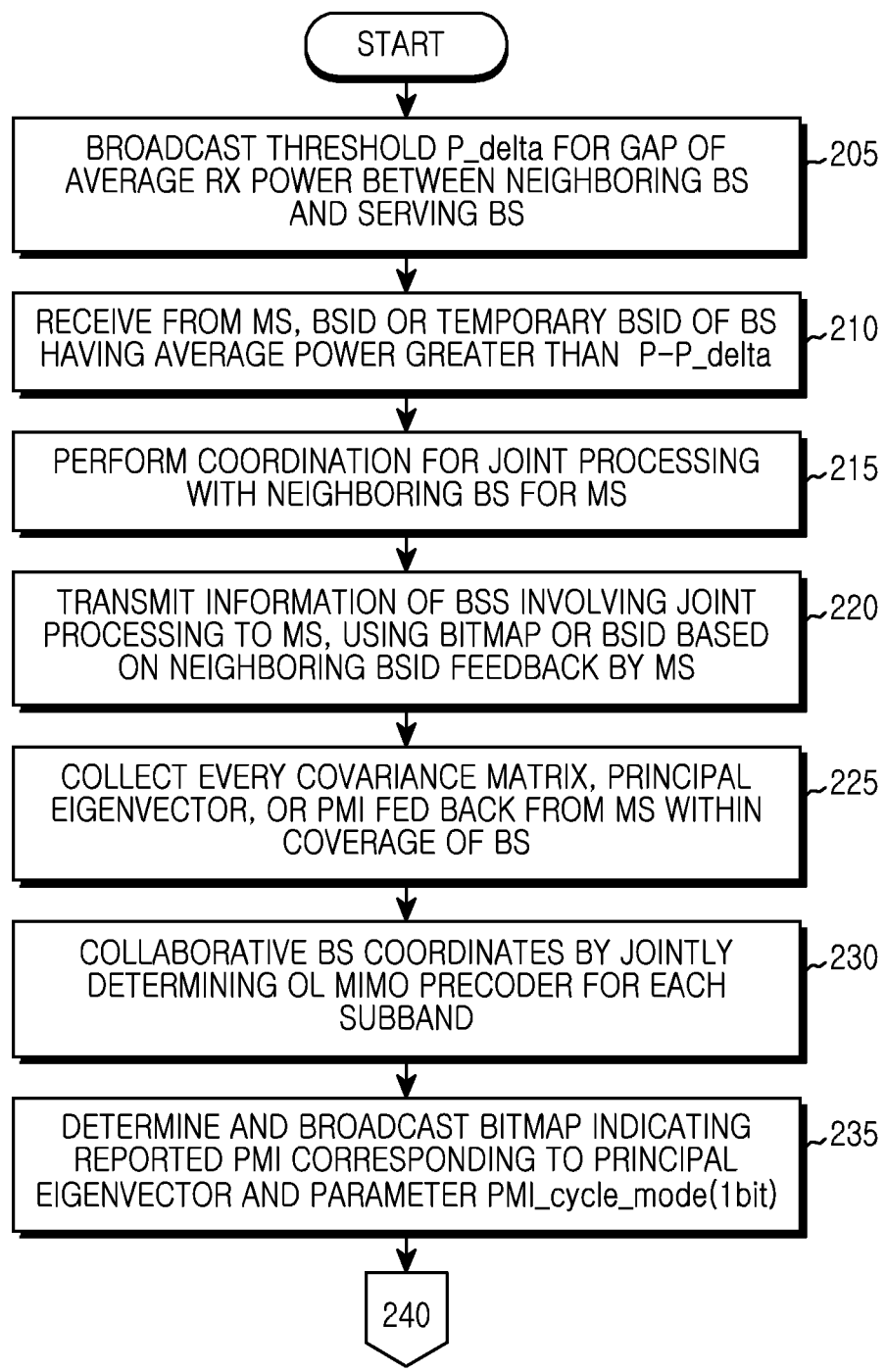
FIG. 2A is a first flowchart of operations of a base station according to an exemplary embodiment of the present invention.
Figure 2B:
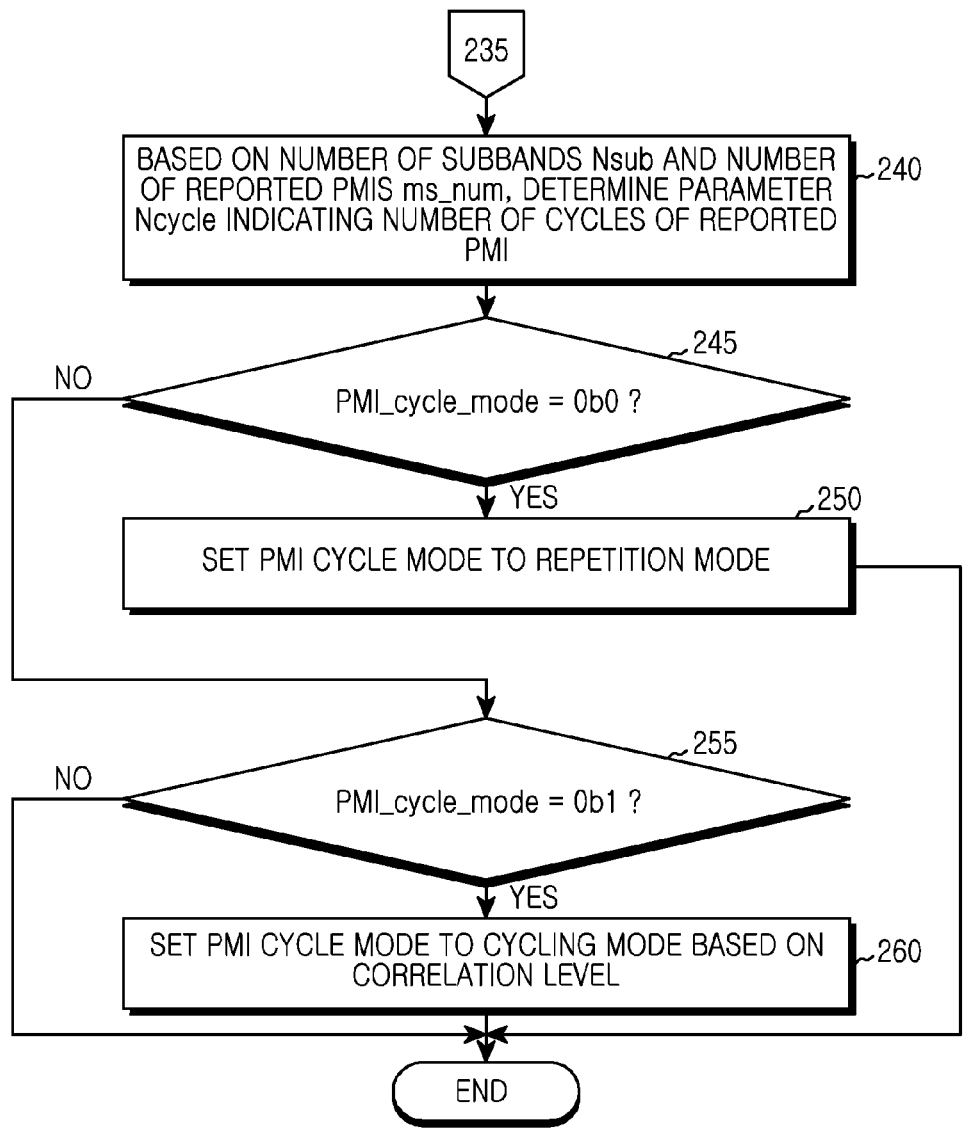
FIG. 2B is a second flowchart of operations of a base station according to an exemplary embodiment of the present invention.

FIG. 2A is a first flowchart of operations of a BS according to an exemplary embodiment of the present invention. FIG. 2B is a second flowchart of operations of a BS according to an exemplary embodiment of the present invention.

Referring to FIGS. 2A and 2B, the BS broadcasts a threshold for a gap of an average Rx power between a neighboring BS and a serving BS in step 205.

In step 210, the BS receives from the MS, a BSID or a temporary BSID of the BS having an average power greater than P−P_delta. Herein, P is the Rx power of the serving BS reference signal.

In step 215, the BS performs coordination for joint processing with the neighboring BS for the MS.

In step 220, the BS transmits to the MS, information of the BSs involving the joint processing, using the bitmap or the BSID based on a neighboring BSID feedback by the MS.

In step 225, the BS collects every covariance matrix, principal eigenvector, or PMI fed back from the MS within its coverage area.

In step 230, the BS (i.e., a collaborative BS) coordinates by jointly determining an OL MIMO precoder for each subband.

Herein, the number of MSs served by the collaborative BS is referred to as ms_num, and the PMI reported by the i-th MS for the j-th collaborative BS is Vi,j.

In step 235, the BS broadcasts one bitmap indicating the reported PMI corresponding to the principal eigenvector, and a parameter PMI_cycle_mod e(1 bit).

In step 240, with the number of the subbands Nsub and the number of the reported PMIs ms_num, the BS determines a parameter Ncycle indicating the number of cycles of the reported PMI based on Equation 1.

When PMI_cycle_mode=0b0 in step 245, the BS sets the PMI cycle mode to a repetition mode in step 250.

When PMI_cycle_mode=0b1 in step 255, the BS sets the PMI cycle mode to a cycling mode based on a correlation level in step 260.

Figure 3A:
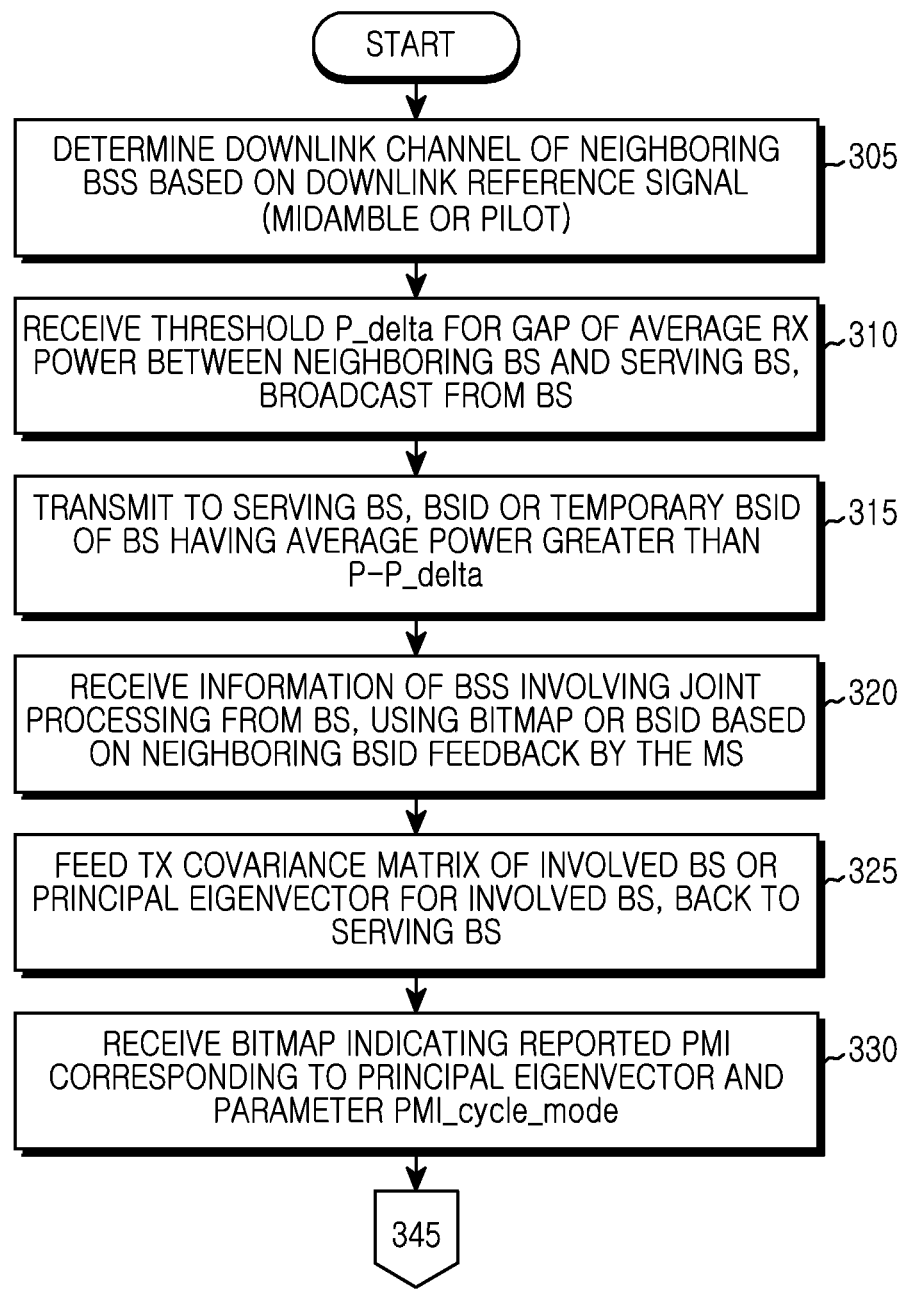
FIG. 3A is a first flowchart of operations of a mobile station according to an exemplary embodiment of the present invention.
Figure 3B:
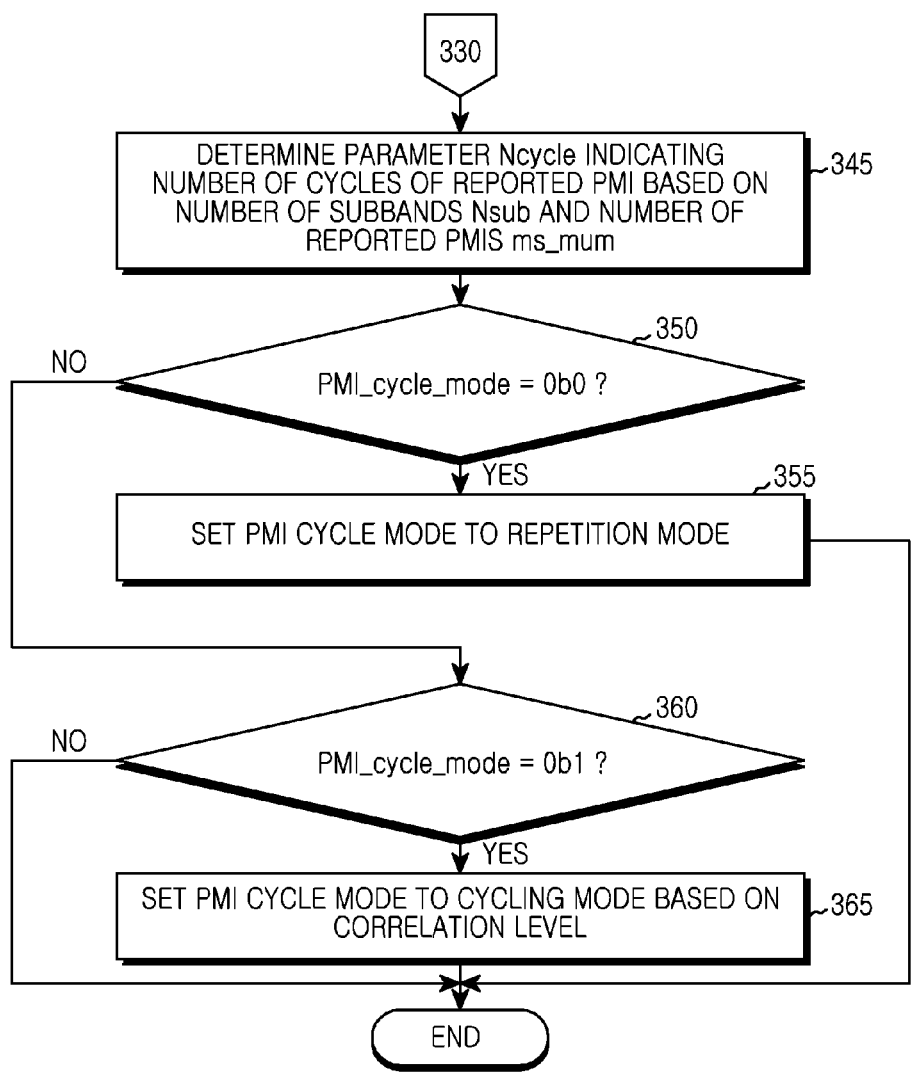
FIG. 3B is a second flowchart of operations of a mobile station according to an exemplary embodiment of the present invention.

FIG. 3A is a first flowchart of operations of an MS according to an exemplary embodiment of the present invention. FIG. 3B is a second flowchart of operations of an MS according to an exemplary embodiment of the present invention.

Referring to FIGS. 3A and 3B, the MS determines a downlink channel of the neighboring BSs based on a downlink reference signal in step 305. The MS can measure a reference signal of the serving BS. Herein, the reference signal can be a midamble signal or a pilot signal.

In step 310, the MS receives the threshold for the gap of the average Rx power between the neighboring BS and the serving BS, broadcast from the BS. Hereinafter, the threshold is referred to as P_delta.

In step 315, the MS transmits to the serving BS, a BSID or a temporary BSID of the BS having an average power greater than P−P_delta. Herein, P is Rx power of the serving BS reference signal.

In step 320, the MS receives the information of the BSs involving the joint processing from the BS, using the bitmap or the BSID based on the neighboring BSID feedback by the MS.

In step 325, the MS feeds a Tx covariance matrix of an involved BS or a principal eigenvector for the involved BS, back to the serving BS.

The principal eigenvector can be expressed as a PMI. This is to find the vector U in the codebook, for the eigenvector V (in 1 by m dimension). U is indicated by the PMI and is the vector for maximizing norm(V*U').

In step 330, the MS receives the bitmap indicating the reported PMI corresponding to the principal eigenvector and the parameter PMI_cycle_mod e(1 bit).

In step 345, the MS determines the parameter Ncycle the number of the cycles of the reported PMI based on the number of the subbands Nsub and the number of the reported PMIs ms_num.

When PMI_cycle_mode=0b0 in step 350, the MS sets the PMI cycle mode to a repetition mode in step 355.

When PMI_cycle_mode=0b 1 in step 360, the MS sets the PMI cycle mode to a cycling mode based on the correlation level in step 365.

Figure 4:
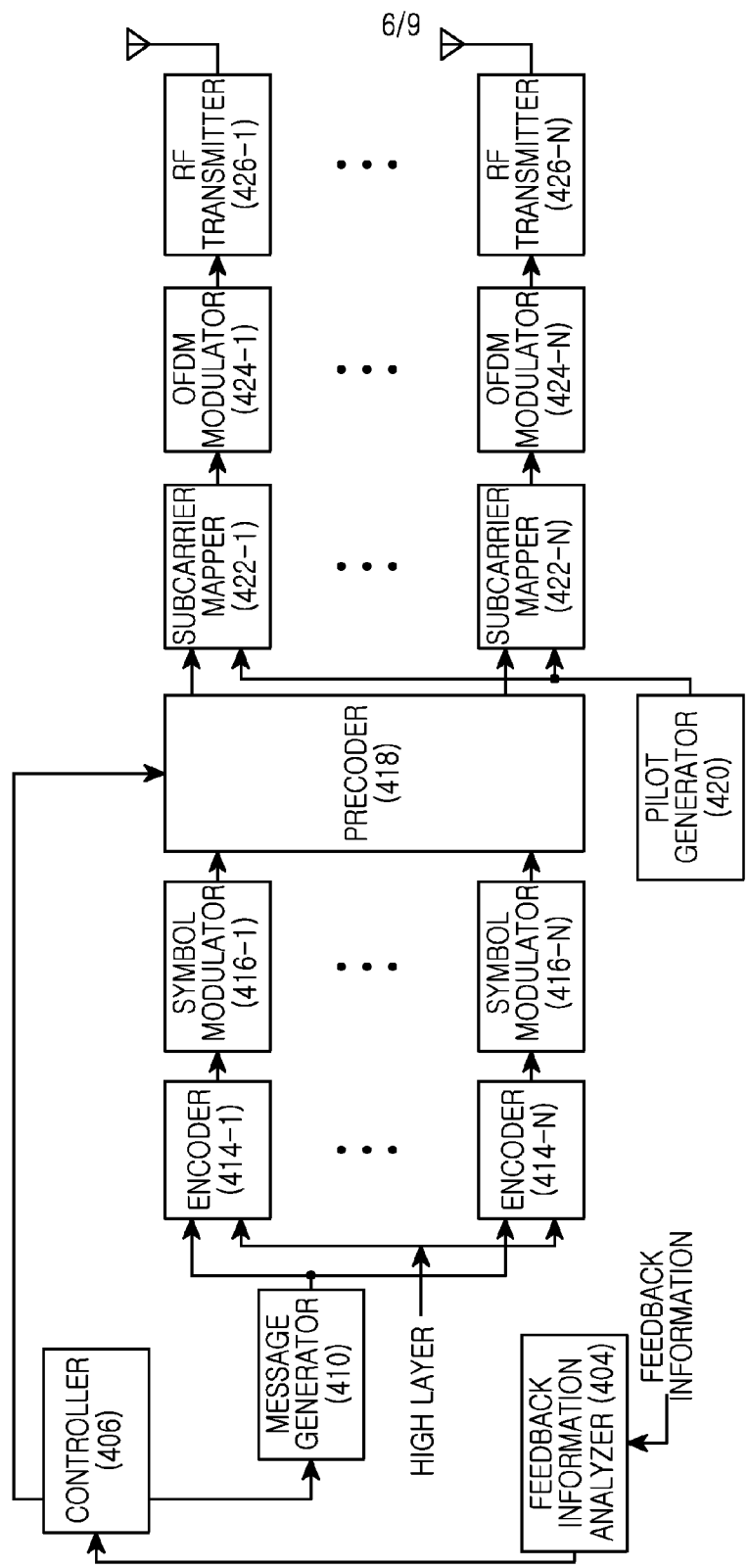
FIG. 4 is a block diagram of a base station according to an exemplary embodiment of the present invention.

FIG. 4 is a block diagram of a BS according to an exemplary embodiment of the present invention.

Referring to FIG. 4, the BS includes a feedback information analyzer 404, a controller 406, a message generator 410, a plurality of encoders 414-1 through 414-N, a plurality of symbol modulators 416-1 through 416-N, a precoder 418, a pilot generator 420, a plurality of subcarrier mappers 422-1 through 422-N, a plurality of OFDM modulators 424-1 through 424-N, and a plurality of Radio Frequency (RF) transmitters 426-1 through 426-N.

The function blocks except for the controller 406, the message generator 410, and the feedback information analyzer 404 can be referred to as a modem. The modem, which is not illustrated in the drawings, includes a receiver which reverses functions of a transmitter.

The feedback information analyzer 404 confirms the information fed back from the MS. That is, the feedback information analyzer 404 converts a signal indicative of the feedback information into an information bit sequence according to a pre-arranged feedback scheme and provides the information bit sequence to the controller 406.

The controller 406 performs a corresponding processing based on the information from the feedback information analyzer 404. When it is necessary to transmit a control message or information, the controller 406 generates and provides corresponding information to the message generator 410.

The message generator 410 generates a message with various information output from the controller 406. Hereinafter, the transmission or the broadcast of the controller 406 indicates a transmission or a broadcast via the message generator 410 and the modem.

The reception of the controller 406 indicates a reception via a modem or the feedback information analyzer 404.

The controller 406 broadcasts the threshold P_delta for the gap of an average Rx power between a neighboring BS and a serving BS.

The controller 406 receives from the MS, a BSID or a temporary BSID of the BS having an average power greater than P−P_delta via the modem. Herein, P is the Rx power of the serving BS reference signal.

The controller 406 performs the coordination for the joint processing with the neighboring BS for the MS through the modem.

The controller 406 transmits the information of the BSs involving the joint processing, using the bitmap or the BSID based on a neighboring BSID feedback of the MS, to the MS via the modem.

The controller 406 collects every covariance matrix, principal eigenvector, or PMI fed back from the MS within the coverage area of the BS via the modem.

The controller 406 coordinates the subbands of the BS by jointly determining an OL MIMO precoder with other BS (i.e., a collaborative BS).

The controller 406 determines and broadcasts the bitmap indicating the PMI previously reported and corresponding to the principal eigenvector, and the parameter via the modem.

Based on the number of the subbands Nsub and the number of the reported PMIs ms_num, the controller 460 determines a parameter Ncycle indicating the number of the cycles of the reported PMI based on Equation 1.

When PMI_cycle_mode=0b0, the controller 406 sets the PMI cycle mode to a repetition mode. When PMI_cycle_mode=0b1, the controller 406 sets the PMI cycle mode to a cycling mode based on the correlation level.

The message generator 410 generates the control message based on corresponding information and provides the control message to the encoders 414-1 through 414-N.

The encoders 414-1 through 414-N each encode a data bit sequence output from the message generator 410 or a high layer. The symbol modulators 416-1 through 416-N each modulate and convert the encoded bit sequence into complex symbols.

The precoder 418 performs the precoding to remove an inter-cell interference. That is, the precoder 418 precodes Tx signals using the precoding vector PMI output from the controller 406.

The pilot generator 420 generates and provides pilot signals to the subcarrier mappers 422-1 through 422-N. When the pilot signals are scrambled, the pilot generator 420 multiplies a pilot signal sequence by a scrambling code and then provides the pilot signals multiplied by the scrambling code to the subcarrier mappers 422-1 through 422-N.

The subcarrier mappers 422-1 through 422-N constitute frequency-domain signals by mapping the Tx signals and the pilot signals of their corresponding transmission path among the precoded Tx signals, to the subcarriers.

The OFDM modulators 424-1 through 424-N convert the frequency-domain signals into time-domain signals using Inverse Fast Fourier Transform (IFFT), and constitute OFDM symbols of the baseband by inserting a Cyclic Prefix (CP).

The RF transmitters 426-1 through 426-N convert the OFDM symbols of the baseband into an RF signal and transmit the RF signal over antennas.

As constructed above, the controller 406 can function as the feedback information analyzer 404 and the message generator 410. The information analyzer 404 and the message generator 410 are separately illustrated here to distinguish various exemplary functions of the present invention. However, the separate illustration should not limit the scope of the present invention.

In an exemplary implementation, the controller 406 may process all or part of the functions of the feedback information analyzer 404 and the message generator 410.

Figure 5:
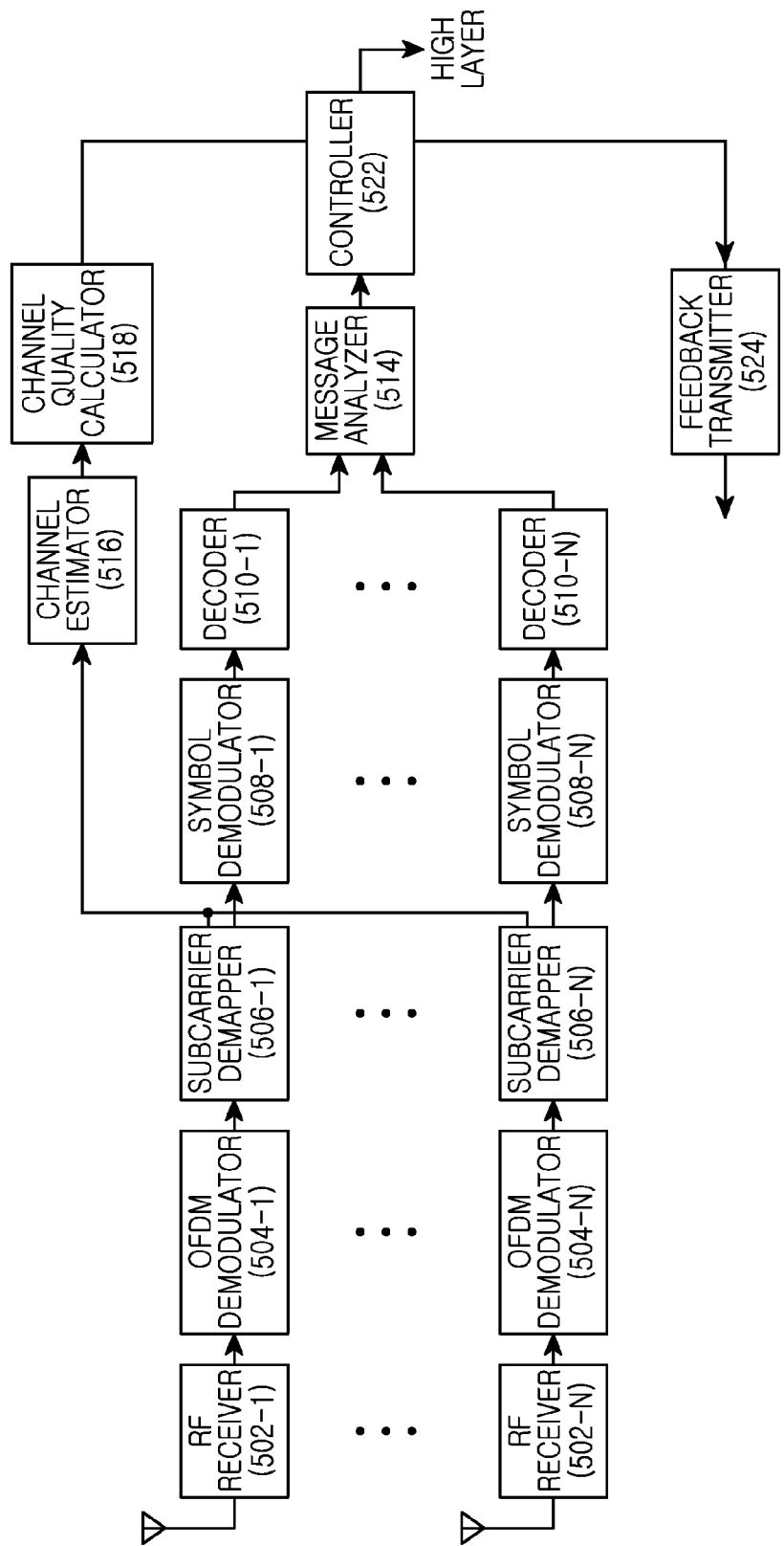
FIG. 5 is a block diagram of a mobile station according to an exemplary embodiment of the present invention.

FIG. 5 is a block diagram of a MS according to an exemplary embodiment of the present invention.

Referring to FIG. 5, the MS includes a plurality of RF receivers 502-1 through 502-N, a plurality of OFDM demodulators 504-1 through 504-N, a plurality of subcarrier demappers 506-1 through 506-N, a plurality of symbol demodulators 508-1 through 508-N, a plurality of decoders 510-1 through 510-N, a message analyzer 514, a channel estimator 516, a channel quality calculator 518, a controller 522, and a feedback transmitter 524.

The function blocks, except for the controller 522, the message analyzer 514, the channel estimator 516, and the channel quality calculator 518, can be referred to as a receiver.

A modem, which is not illustrated in the drawing, includes a transmitter which reverses the functions of the receiver.

The reception of the controller 522 indicates a reception via the modem or the message analyzer 514. Transmission of the controller 522 indicates the transmission via the feedback transmitter 524 or the modem.

The RF transmitters 502-1 through 502-N convert the RF signal received over antennas into a baseband signal. The OFDM demodulators 504-1 through 504-N divide the baseband signal into the OFDM symbols, remove a CP, and restore complex symbols mapped to a frequency domain using a Fast Fourier Transform (FFT) operation.

The symbol demodulators 508-1 through 508-N each demodulate and convert the complex symbols into an encoded bit sequence. The encoders 510-1 through 510-N each decode the encoded bit sequence.

The message analyzer 514 analyzes a received control message and information, obtains data contained in the control message and information, performs a corresponding function, and provides the corresponding data to the controller 522.

The controller 522 measures a downlink channel of neighboring BSs based on a downlink reference signal through the channel estimator 516 and the channel quality calculator 518. Herein, the reference signal can be a midamble signal or a pilot signal.

The controller 522 receives a broadcast threshold for a gap of an average Rx power between the neighboring BS and the serving BS, from the BS via the modem. Hereinafter, the threshold is referred to as P_delta.

The controller 522 transmits to the serving BS, a BSID or a temporary BSID of the BS having an average power greater than P−P_delta via the modem. Herein, P is the Rx power of the serving BS reference signal.

The controller 522 receives the information of the BSs involving joint processing from the BS via the modem, using a bitmap or the BSID based on a neighboring BSID feedback of the MS.

The controller 522 feeds a Tx covariance matrix of an involved BS or a principal eigenvector for the involved BS, back to a serving BS via the feedback transmitter 524. The principal eigenvector can be expressed as the PMI. This is to find the vector U in the codebook, for the eigenvector V (in 1 by m dimension). U is indicated by a PMI and is a vector for maximizing norm(V*U').

The controller 522 receives the bitmap indicating the reported PMI corresponding to the principal eigenvector and a parameter PMI_cycle_mod e(1 bit) via the modem.

The controller 522 determines a parameter Ncycle indicating the number of the cycles of the reported PMI based on the number of subbands Nsub and the number of reported PMIs ms_num.

When PMI_cycle_mode=0b0, the controller 522 sets a PMI cycle mode to a repetition mode.

When PMI_cycle_mode=0b1, the controller 522 sets the PMI cycle mode to a cycling mode based on a correlation level.

The channel estimator 516 estimates a channel matrix of the BS and the neighboring BSs using the pilot signal output from the subcarrier demappers 506-1 through 506-N.

More specifically, the channel estimator 516 estimates a downlink channel of the serving BS using the reference signal or the pilot signal from the BS, and estimates the downlink channel matrix of the neighboring BSs using the reference signal or the pilot signal from the neighboring BS.

The channel quality calculator 518 determines and provides channel quality to the controller 522. Herein, the channel quality indicates channel quality when the precoding vector is applied.

The feedback transmitter 524 transmits the feedback information generated by the controller 522 to the BS. That is, the feedback transmitter 524 converts the feedback information into a physical signal and transmits the physical signal over the antennas.

As constructed above, the controller 522 can function as the message analyzer 514, the channel estimator 516, and the channel quality calculator 518. The message analyzer 514, the channel estimator 516, and the channel quality calculator 518 are separately illustrated herein to distinguish various exemplary functions of the present invention. However, the separate illustration should not limit the scope of the present invention.

In an exemplary implementation, the controller 522 may process all or part of the functions of the message analyzer 514, the channel estimator 516, and the channel quality calculator 518.

As described above, performance loss resulting from channel mismatch can be reduced. An eigenvector feedback is a long wide band feedback and provides very limited overhead. A PMI repetition mode and a PMI cycling mode based on the correlation of exemplary embodiments of the present invention can achieve user diversity and good channel matching between coordination BSs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Mobile Station (MS) in a wireless communication system, the method comprising:
    receiving a threshold for a gap of an average Receive (Rx) power between a neighboring Base Station (BS) and a serving BS;
    transmitting to the serving BS, identification information of a BS having the average power greater than a first value;
    receiving information of a BS involving joint processing generated using information of the BS having the average power greater than the first value;
    feeding Precoding Matrix Index (PMI) information of the BS involving the joint processing, back to the serving BS;
    receiving information indicating a PMI operation mode of the MS, from the serving BS; and
    determining a PMI operation mode according to the information indicating the PMI operation mode of the MS.

2. The method of claim 1, further comprising:
    measuring a downlink channel of at least one of the neighboring BS and the serving BS based on a downlink reference signal.

3. The method of claim 1, wherein the information of the BS involving the joint processing generated using the information of the BS having the average power greater than the first value comprises a bitmap or a BS IDentification (BSID) of the BS having the average power greater than the first value, and
    the bitmap or the BSID is based on feedback for a neighboring BS of the MS.

4. The method of claim 1, wherein the determining of the PMI operation mode according to the information indicating the PMI operation mode of the MS comprises:
    determining a parameter indicating a number of cycles of each PMI reported, based on a number of subbands and a number of reported PMIs; and
    if the information indicating the PMI operation mode indicates a repetition mode, setting a PMI cycle mode to the repetition mode.

5. The method of claim 1, wherein the determining of the PMI operation mode according to the information indicating the PMI operation mode of the MS comprises:
    determining a parameter indicating a number of cycles of each PMI reported, based on a number of subbands and a number of reported PMIs; and
    if the information indicating the PMI operation mode indicates a cycle mode, setting the PMI operation mode to the cycle mode.

6. The method of claim 1, wherein the first value is obtained by subtracting the threshold from a Receive (Rx) power of a reference signal of the serving BS.

7. The method of claim 1, wherein the identification information comprises a BS IDentification (BSID) or a temporary BSID of the BS having the average power greater than the first value.

8. The method of claim 1, wherein the PMI information comprises a Transmit (Tx) covariance matrix or a principal eigenvector of the BS involving the joint processing.

9. The method of claim 1, wherein the information indicating the PMI operation mode comprises information indicating a bitmap indicative of the PMI corresponding to a principal eigenvector, and a PMI cycle mode.

10. An operating method of a Base Station (BS) in a wireless communication system, the method comprising:
    receiving from a Mobile Station (MS), identification information of a BS having an average power greater than a first value;
    performing coordination for joint processing with a neighboring BS for the MS using the identification information;
    transmitting information of a BS involving the joint processing, to the MS;
    receiving Precoding Matrix Index (PMI) information fed back from the MS within a coverage area;
    coordinating subbands by jointly determining a precoder with collaborative BSs; and
    broadcasting information indicating a PMI operation mode of the MS.

11. The method of claim 10, further comprising, before the receiving of the identification information of the BS having the average power greater than the first value from the MS:
    broadcasting a threshold for a gap of an average Receive (Rx) power between the neighboring BS and a serving BS.

12. The method of claim 10, wherein the information of the BS involving joint processing comprises a bitmap or a BS IDentificiation (BSID), and
    the bitmap is based on neighboring BSID feedback of the MS.

13. The method of claim 10, wherein the broadcasting of the information indicating the PMI operation mode of the MS comprises:
    determining a parameter indicating a number of cycles of each PMI reported, based on a number of subbands and a number of reported PMIs;

if the information indicating the PMI operation mode indicates a repetition mode, setting the PMI operation mode to the repetition mode; and broadcasting the information indicating the PMI operation mode of the MS.

14. The method of claim 10, wherein the broadcasting of the information indicating the PMI operation mode of the MS comprises:

determining a parameter indicating a number of cycles of each PMI reported, based on a number of subbands and a number of reported PMIs;

if the information indicating the PMI operation mode indicates a cycle mode, setting the PMI operation mode to the cycle mode; and broadcasting the information indicating the PMI operation mode of the MS.

15. The method of claim 10, wherein the first value is obtained by subtracting a threshold from a Receive (Rx) power of a reference signal of the BS.

16. The method of claim 10, wherein the identification information comprises a BS IDentification (BSID) or a temporary BSID of the BS having the average power greater than the first value.

17. The method of claim 10, wherein the PMI information comprises a Transmit (Tx) covariance matrix or a principal eigenvector of the BS involving the joint processing.

18. The method of claim 10, wherein the information indicating the PMI operation mode comprises information indicating a bitmap indicative of the PMI corresponding to a principal eigenvector, and a PMI cycle mode.

19. An apparatus of a Mobile Station (MS) in a wireless communication system, the apparatus comprising:

a controller for receiving a threshold for a gap of an average Receive (Rx) power between a neighboring Base Station (BS) and a serving BS, for transmitting to the serving BS, identification information of a BS having the average power greater than a first value, for receiving information of a BS involving joint processing generated using information of the BS having the average power greater than the first value, for feeding Precoding Matrix Index (PMI) information of the BS involving the joint processing back to the serving BS, for receiving information indicating a PMI operation mode of the MS from the serving BS, and for determining a PMI operation mode according to the information indicating the PMI operation mode of the MS; and a modem for converting information received from the controller into a signal, for transmitting the signal, and for converting a received signal into information.

20. The apparatus of claim 19, wherein the controller measures a downlink channel of at least one of the neighboring BS and the serving BS based on a downlink reference signal.

21. The apparatus of claim 19, wherein the information of the BS involving the joint processing generated using the information of the BS having the average power greater than the first value comprises a bitmap or a BS IDentification (BSID) of the BS having the average power greater than the first value, and the bitmap or the BSID is based on feedback for a neighboring BS of the MS.

22. The apparatus of claim 19, wherein, when determining the PMI operation mode according to the information indicating the PMI operation mode of the MS, the controller determines a parameter indicating a number of cycles of each PMI reported, based on a number of subbands and a number of reported PMIs, and sets a PMI cycle mode to a repetition mode when the information indicating the PMI operation mode indicates the repetition mode.

23. The apparatus of claim 19, wherein, when determining the PMI operation mode according to the information indicating the PMI operation mode of the MS, the controller determines a parameter indicating a number of cycles of each PMI reported, based on a number of subbands and a number of reported PMIs, and sets the PMI operation mode to a cycle mode when the information indicating the PMI operation mode indicates the cycle mode.

24. The apparatus of claim 19, wherein the first value is obtained by subtracting the threshold from the Rx power of a reference signal of the serving BS.

25. The apparatus of claim 19, wherein the identification information comprises a BS IDentification (BSID) or a temporary BSID of the BS having the average power greater than the first value.

26. The apparatus of claim 19, wherein the PMI information comprises a Transmit (Tx) covariance matrix or a principal eigenvector of the BS involving the joint processing.

27. The apparatus of claim 19, wherein the information indicating the PMI operation mode comprises information indicating a bitmap indicative of the PMI corresponding to a principal eigenvector, and a PMI cycle mode.

28. An apparatus of a Base Station (BS) in a wireless communication system, the apparatus comprising:

a controller for receiving from a Mobile Station (MS), identification information of a BS having an average power greater than a first value, for performing coordination for joint processing with a neighboring BS for the MS using the identification information, for transmitting information of a BS involving the joint processing to the MS, for receiving Precoding Matrix Index (PMI) information fed back from the MS within a coverage area, for coordinating subbands by jointly determining a precoder with collaborative BSs, and for broadcasting information indicating a PMI operation mode of the MS; and a modem for converting information received from the controller into a signal, for transmitting the signal, and for converting a received signal into information.

29. The apparatus of claim 28, wherein, before receiving the identification information of the BS having the average power greater than the first value from the MS, the controller broadcasts a threshold for a gap of an average Receive (Rx) power between the neighboring BS and a serving BS.

30. The apparatus of claim 28, wherein the information of the BS involving the joint processing comprises a bitmap or a BS IDentificiation (BSID), and the bitmap is based on neighboring BSID feedback of the MS.

31. The apparatus of claim 28, wherein, when broadcasting the information indicating the PMI operation mode of the MS, the controller determines a parameter indicating a number of cycles of each PMI reported, based on a number of subbands and a number of reported PMIs, sets the PMI operation mode to a repetition mode when the information indicating the PMI operation mode indicates the repetition mode, and broadcasts the information indicating the PMI operation mode of the MS.

32. The apparatus of claim 28, wherein, when broadcasting the information indicating the PMI operation mode of the MS, the controller determines a parameter indicating a number of cycles of each PMI reported, based on a number of subbands and a number of reported PMIs, sets the PMI operation mode to a cycle mode when the information indicating the PMI operation mode indicates the cycle mode, and broadcasts the information indicating the PMI operation mode of the MS.

33. The apparatus of claim 28, wherein the first value is obtained by subtracting a threshold from a Receive (Rx) power of a reference signal of the BS.

34. The apparatus of claim 28, wherein the identification information comprises a BS IDentification (BSID) or a temporary BSID of the BS having the average power greater than the first value.

35. The apparatus of claim 28, wherein the PMI information comprises a Transmit (Tx) covariance matrix or a principal eigenvector of the BS involving the joint processing.

36. The apparatus of claim 28, wherein the information indicating the PMI operation mode comprises information indicating a bitmap indicative of the PMI corresponding to a principal eigenvector, and a PMI cycle mode.

* * * * *